United States Patent
Yoon et al.

(10) Patent No.: US 11,072,242 B2
(45) Date of Patent: Jul. 27, 2021

(54) OFF-PREVENTION CIRCUIT OF CONTACTOR

(71) Applicant: LG CHEM, LTD., Seoul (KR)

(72) Inventors: Ho Byung Yoon, Daejeon (KR); Chang Hyun Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 201 days.

(21) Appl. No.: 16/339,927

(22) PCT Filed: Feb. 21, 2018

(86) PCT No.: PCT/KR2018/002127
§ 371 (c)(1),
(2) Date: Apr. 5, 2019

(87) PCT Pub. No.: WO2019/004558
PCT Pub. Date: Jan. 3, 2019

(65) Prior Publication Data
US 2020/0052511 A1    Feb. 13, 2020

(30) Foreign Application Priority Data
Jun. 28, 2017    (KR) .................. 10-2017-0081732

(51) Int. Cl.
*B60L 3/00*         (2019.01)
*B60L 58/10*        (2019.01)
*H02J 7/00*         (2006.01)

(52) U.S. Cl.
CPC ............ *B60L 3/0046* (2013.01); *B60L 58/10* (2019.02); *H02J 7/0036* (2013.01); *H02J 7/00304* (2020.01)

(58) Field of Classification Search
CPC ..................................... H02J 7/0034
(Continued)

(56) References Cited

U.S. PATENT DOCUMENTS 9,077,186 B2 * 7/2015 Arakawa ............... H01M 10/46
9,148,070 B2    9/2015 Bae et al.
(Continued)

FOREIGN PATENT DOCUMENTS

CN    103068620 A    4/2013
CN    104037819 A    9/2014
(Continued)

OTHER PUBLICATIONS

International Search Report (PCT/ISA/210) issued in PCT/KR2018/002127, dated Jun. 15, 2018.
(Continued)

*Primary Examiner* — Edward Tso
*Assistant Examiner* — Ahmed H Omar
(74) *Attorney, Agent, or Firm* — Birch, Stewart, Kolasch & Birch, LLP

(57) ABSTRACT

An off-prevention circuit has a battery management system and a contactor multi-connected via a plurality of positive electrode terminals and a plurality of negative electrode terminals provided in each of the battery management system and the contactor. Even when any one connection among the connections of the plurality of positive electrode terminals and the plurality of negative electrode terminals is disconnected or opened, it is possible to maintain supply of power supplied from the battery management system to the contactor through another connection of the positive electrode terminal and the negative electrode terminal.

3 Claims, 4 Drawing Sheets

(58) Field of Classification Search
USPC .......................................................... 320/134
See application file for complete search history.

(56) References Cited

U.S. PATENT DOCUMENTS

| | | | |
|---|---|---|---|
| 9,819,059 B2 | 11/2017 | Park | |
| 9,893,550 B2 | 2/2018 | Yoo | |
| 10,199,843 B2* | 2/2019 | Schimel | H02J 7/0071 |
| 2004/0017175 A1 | 1/2004 | Lee et al. | |
| 2010/0156578 A1 | 6/2010 | Schmidt et al. | |
| 2013/0038294 A1 | 2/2013 | Hur | |
| 2013/0154360 A1 | 6/2013 | Ito | |
| 2016/0288649 A1* | 10/2016 | Ono | B60L 3/0046 |
| 2017/0080883 A1* | 3/2017 | Yasunori | H02J 7/0063 |

FOREIGN PATENT DOCUMENTS

| | | |
|---|---|---|
| EP | 2518859 A2 | 10/2012 |
| JP | 2010-154621 A | 7/2010 |
| JP | 2013-246971 A | 12/2013 |
| JP | 2015-186453 A | 11/2015 |
| JP | 2016-178792 A | 10/2016 |
| JP | 2017-50938 A | 3/2017 |
| KR | 10-2004-0009318 A | 1/2004 |
| KR | 10-2006-0047106 A | 5/2006 |
| KR | 10-0982868 B1 | 9/2010 |
| KR | 10-1024497 B1 | 3/2011 |
| KR | 10-2016-0066301 A | 6/2016 |
| KR | 10-1689222 B1 | 12/2016 |

OTHER PUBLICATIONS

Extended European Search Report, dated Jan. 9, 2020, for European Application No. 18825076.5.
Office Action of Indian Patent Office in Application No. 201917017338, dated Mar. 17, 2021.

* cited by examiner

[Figure 2]
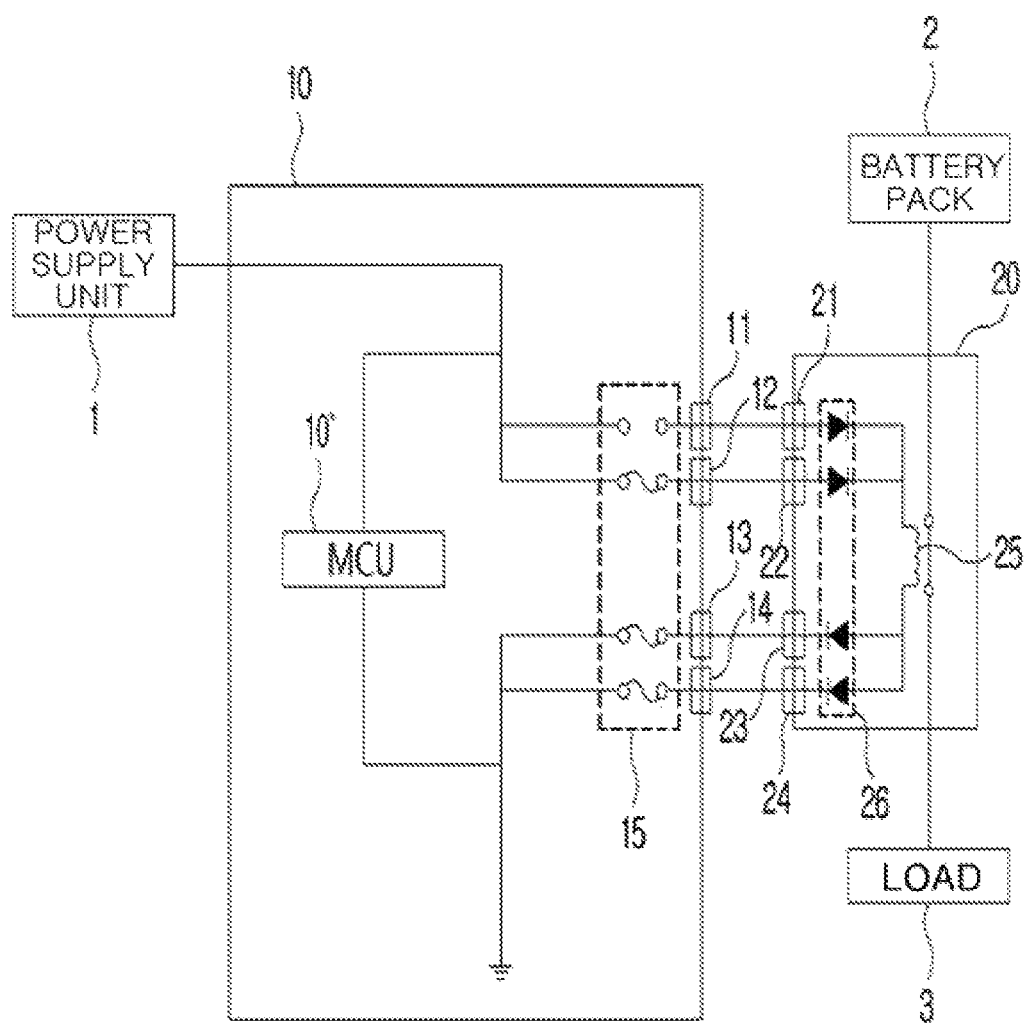

[Figure 3]
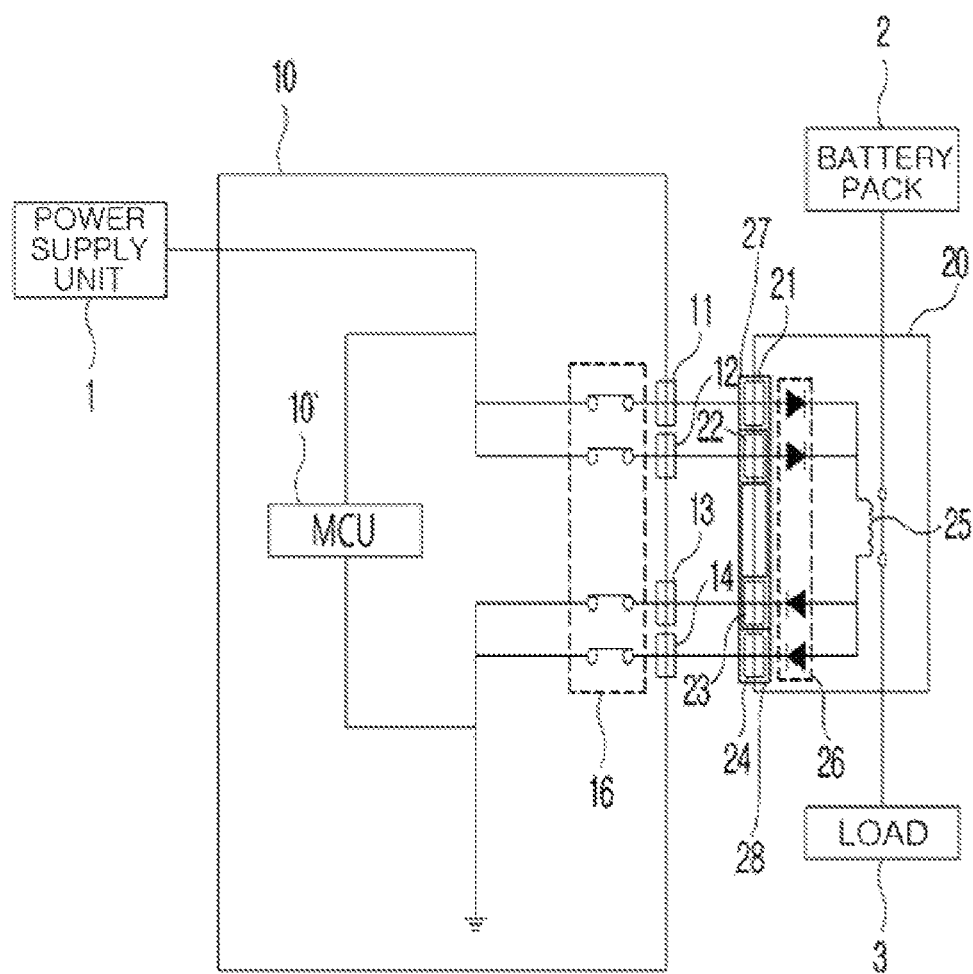

[Figure 4]
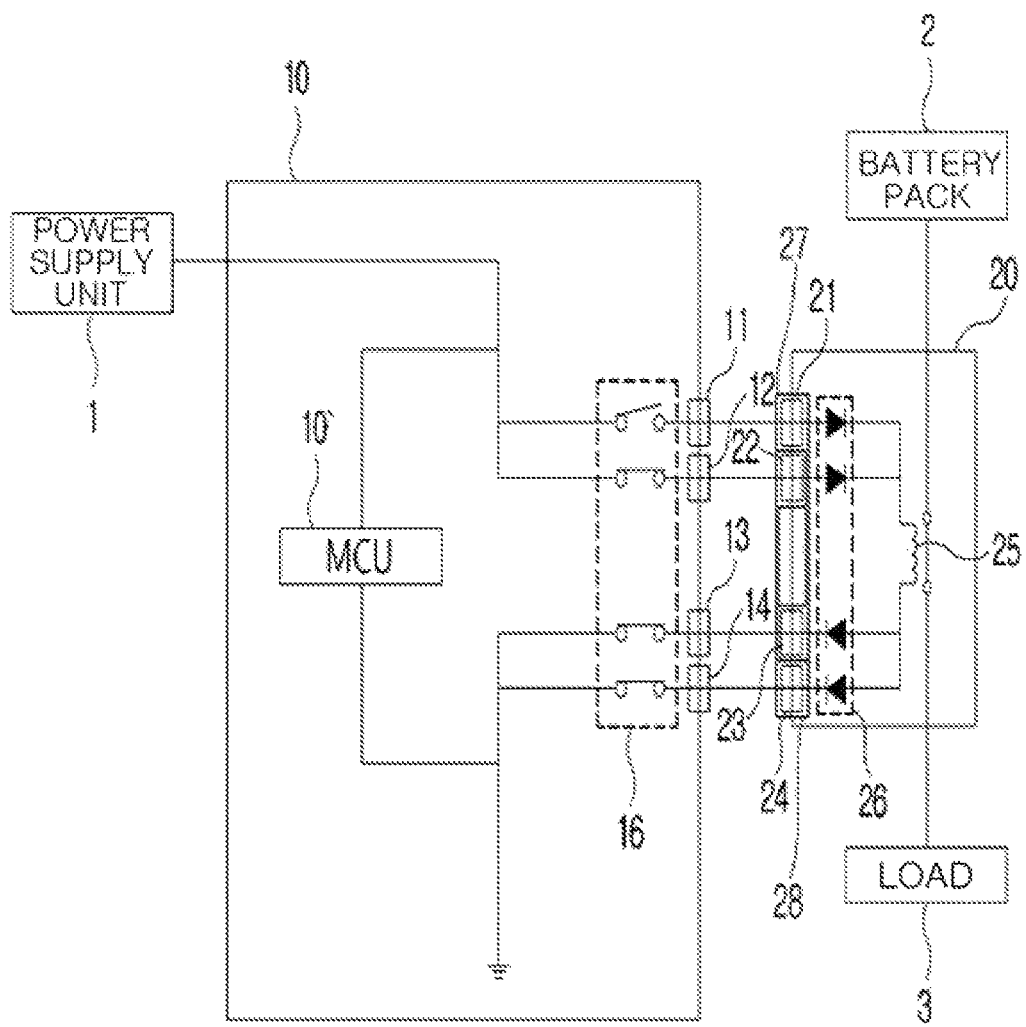

OFF-PREVENTION CIRCUIT OF CONTACTOR

This application claims priority to and the benefit of Korean Patent Application No. 10-2017-0081732 filed in the Korean Intellectual Property Office on Jun. 28, 2017, the entire contents of which are incorporated herein by reference.

TECHNICAL FIELD

The present invention relates to a off-prevention circuit of contactor, and more particularly, to a off-prevention circuit of contactor, in which a battery management system and a contactor are multi-connected via a plurality of positive electrode terminals and a plurality of negative electrode terminals provided in each of the battery management system and the contactor, so that even when any one connection among the connections of the plurality of positive electrode terminals and the plurality of negative electrode terminals is disconnected or opened, it is possible to maintain supply of power supplied from the battery management system to the contactor through another connection of the positive electrode terminal and the negative electrode terminal.

BACKGROUND ART

Recently, due to environmental pollution caused by depletion of fossil energy and use of fossil energy, an interest in an electric product which may be driven by using a battery without using fossil energy has been increased.

Accordingly, research and development on an electric vehicle (EV) and a hybrid vehicle which is capable of solving pollution and energy problems has been actively conducted in recent.

Herein, the EV is a vehicle which mainly obtains power and is driven by driving an alternating current (AC) or direct current (DC) motor by using power of a battery, and is generally divided into a battery dedicated electric vehicle and a hybrid electric vehicle.

In this case, the battery dedicated electric vehicle drives a motor by using only power of the battery, so that a high-output secondary battery and a high-capacity secondary battery are used in most of the battery dedicated electric vehicles, and thus, recently, research on peripheral components and devices related to a secondary battery is also variously conducted.

For example, recently, research on various components or devices, such as a battery pack manufactured by connecting a plurality of battery cells in series and in parallel, a battery management system (BMS) controlling charging/discharging of a battery pack and monitoring a state of each battery, and a contactor connecting a battery pack to a load, such as an inverter, has been conducted.

Among them, the contactor is a switch which connects a battery pack and a load and controls supply of power supplied from the battery pack to the load, and is mainly configured to connect the battery pack and the load based on a magnetic field when a coil provided in the contactor receives a voltage via a BMS and generates the magnetic field.

In the meantime, each of the BMS and the contactor is connected via one positive electrode terminal and one negative electrode terminal, and even when any one of the positive electrode terminal and the negative electrode terminal has abnormality, power supplied to the contactor is simultaneously blocked, so that there is a problem in that the contactor is unnecessarily turned off only due to the simple abnormality of the terminal.

Further, the positive electrode terminal and the negative electrode terminal of the contactor connected with the positive electrode terminal and the negative electrode terminal of the BMS use only one connector, so that even when the connector simply has abnormality, there is a problem in that the contactor is unnecessarily turned off.

Further, due to the problem in that the contactor is unnecessarily turned off described above, a travelling EV may suddenly lose power and stop, and the sudden stop of the vehicle may cause a minor collision or rollover of the vehicle.

DETAILED DESCRIPTION OF THE INVENTION

Technical Problem

An object of the present invention is to provide a off-prevention circuit of contactor, in which a battery management system and a contactor are multi-connected via a plurality of positive electrode terminals and a plurality of negative electrode terminals provided in each of the battery management system and the contactor, so that even when any one connection among the connections of the plurality of positive electrode terminals and the plurality of negative electrode terminals is disconnected or opened, it is possible to maintain supply of power supplied from the battery management system to the contactor through another connection of the positive electrode terminal and the negative electrode terminal.

Another object of the present invention is to provide a off-prevention circuit of contactor, in which a plurality of positive electrode terminals and a plurality of negative electrode terminals provided in a contactor are connected with a battery management system via different connectors, so that even when any one connector has abnormality, it is possible to maintain power supplied from the battery management system via the positive electrode terminal and the negative electrode terminal which are connected with the battery management system via another connector.

Another object of the present invention is to provide a off-prevention circuit of contactor, in which a plurality of fuses or a plurality of switches that is blown or off due to an overcurrent is connected to a plurality of positive electrode terminals and a plurality of negative electrode terminals provided in a battery management system, respectively, so that it is possible to effectively block the overcurrent from flowing into the battery management system due to an external short-circuit.

Technical Solution

An exemplary embodiment of the present invention provides a off-prevention circuit of contactor the circuit including: a battery management system (BMS) which controls power supplied to a contactor, and includes a first BMS positive electrode terminal and a second BMS positive electrode terminal for connection to a positive electrode of a power supply and a first BMS negative electrode terminal and a second. BMS negative electrode terminal for connection to a ground or a negative electrode of the power supply, wherein the contactor makes an on/off connection between a battery pack and a load, the contactor including first contactor positive terminal connected to the first BMS positive electrode terminal and a second contactor positive electrode terminal connected to the second BMS positive electrode terminal, and a first contactor negative electrode terminal connected to the first BMS negative electrode terminal and a second contactor negative electrode terminal connected to the second BMS negative electrode terminal.

In the exemplary embodiment, the battery management system may include a plurality of fuses which is connected to the first BMS positive electrode terminal, the second BMS positive electrode terminal, the first BMS negative electrode terminal, and the second BMS negative electrode terminal, respectively, and is blown based on an overcurrent.

In the exemplary embodiment, the battery management system may include a plurality of switches which is connected to the first BMS positive electrode terminal, the second BMS positive electrode terminal, the first BMS negative electrode terminal, and the second BMS negative electrode terminal, respectively, and is on/off based on an overcurrent.

In the exemplary embodiment, the contactor may include: a coil which is connected to the first contactor positive electrode terminal, the second contactor positive electrode terminal, the first contactor negative electrode terminal, and the second contactor negative electrode terminal, and generates a magnetic field and makes the contactor be on/off; and diodes which are formed between the coil and the first contactor positive electrode terminal, the second contactor positive electrode terminal, the first contactor negative electrode terminal, and the second contactor negative electrode terminal, and determine a direction of a current.

In the exemplary embodiment, the contactor may include: a first connector including the first contactor positive electrode terminal and the first contactor negative electrode terminal; and a second connector including the second contactor positive electrode terminal and the second contactor negative electrode terminal.

Advantageous Effects

According to one aspect of the present invention, there is provided a off-prevention circuit of contactor, in which a battery management system and a contactor are multi-connected via a plurality of positive electrode terminals and a plurality of negative electrode terminals provided in each of the battery management system and the contactor, so that even when any one connection among the connections of the plurality of positive electrode terminals and the plurality of negative electrode terminals is disconnected or opened, it is possible to maintain supply of power supplied from the battery management system to the contactor through another connection of the positive electrode terminal and the negative electrode terminal.

Further, according to another aspect of the present invention, there is provided a off-prevention circuit of contactor, in which a plurality of positive electrode terminals and a plurality of negative electrode terminals provided in a contactor are connected with a battery management system via different connectors, so that even when any one connector has abnormality, it is possible to maintain power supplied from the battery management system via the positive electrode terminal and the negative electrode terminal which are connected with the battery management system via another connector.

Further, according to another aspect of the present invention, there is provided a off-prevention circuit of contactor, in which a plurality of fuses or a plurality of switches that is blown or off due to an overcurrent is connected to a plurality of positive electrode terminals and a plurality of negative electrode terminals provided in a battery management system, respectively, so that it is possible to effectively block the overcurrent from flowing into the battery management system due to an external short-circuit.

BRIEF DESCRIPTION OF DRAWINGS

FIG. 2 is a diagram schematically illustrating a state in which a fuse of the circuit for preventing power off of the contactor according to the exemplary embodiment of the present invention is blown.

FIG. 3 is a diagram schematically illustrating a configuration of a off-prevention circuit of contactor according to another exemplary embodiment of the present invention.

FIG. 4 is a diagram schematically illustrating a state in which a switch of the circuit for preventing power off of the contactor according to another exemplary embodiment of the present invention is off.

MODE FOR CARRYING OUT THE INVENTION

Figure 1:
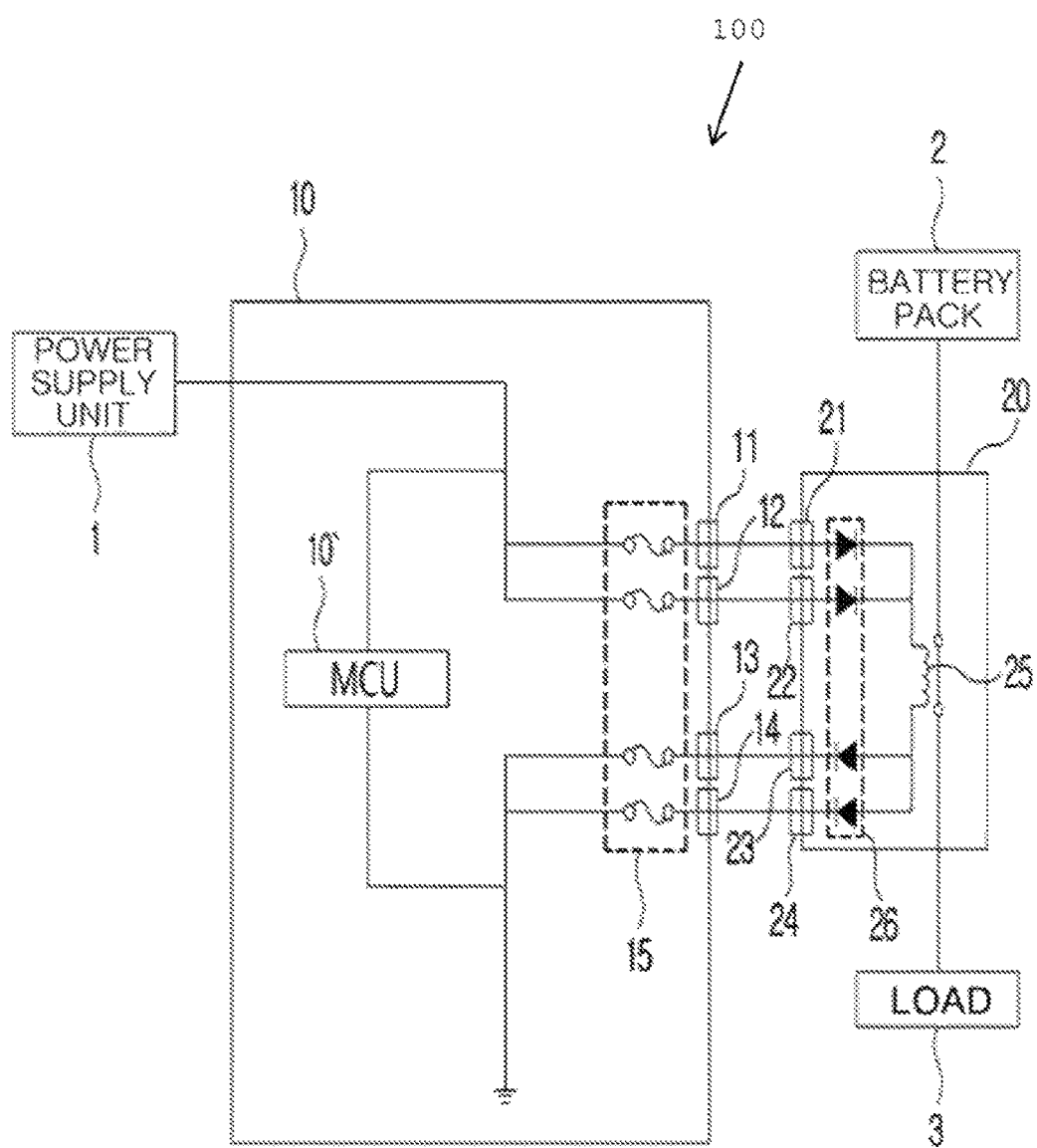
FIG. 1 is a diagram schematically illustrating a configuration of a off-prevention circuit of contactor according to an exemplary embodiment of the present invention.

The present invention will be described in detail with reference to the accompanying drawings. Herein, repeated descriptions, and detailed descriptions of publicly known function and configuration which may unnecessarily make the main point of the present invention be unclear will be omitted. The exemplary embodiment of the present invention is provided for more completely explaining the present invention to those skilled in the art. Accordingly, shapes, sizes, and the like of the elements in the drawing may be exaggerated for a clearer description.

In the entire specification, unless explicitly described to the contrary, when it is said that a part "comprises/includes" a constituent element, this means that another constituent element may be further "included/comprised", not that another constituent element is excluded.

Further, a term "~ unit" described in the specification means a unit of processing one or more functions or operations, and the "~ unit" may be implemented by hardware, software, or a combination of hardware and software.

Further, throughout the specification, "on/off" may mean "open/close" of a switch described in the specification. For example, an off state of a switch may mean that a switch is opened to close a circuit connected with the corresponding switch.

FIG. 1 is a diagram schematically illustrating a configuration of a circuit 100 for preventing power off of a contactor according to an exemplary embodiment of the present invention.

However, the circuit 100 for preventing power off of the contactor illustrated in FIG. 1 is the exemplary embodiment, and constituent elements thereof are not limited to the exemplary embodiment illustrated in FIG. 1, and it is noted that some constituent elements may be added, changed, or deleted as necessary.

Further, it is noted that the circuit 100 for preventing power off of the contactor illustrated in FIG. 1 is applicable to any kind of technical fields to which a secondary battery is applicable.

Further, it is noted that the circuit 100 for preventing power off of the contactor according to the exemplary embodiment of the present invention is applicable to various technical fields as long as a battery is used, in addition to an electric vehicle.

First, referring to FIG. 1, the circuit 100 for preventing power off of the contactor according to the exemplary embodiment of the present invention may include a battery management system (BMS) 10 and a contactor 20.

Herein, the BMS 10 may serve to control power supplied to the contactor 20 from a power supply unit 1 that supplies power as illustrated in FIG. 1.

In this case, the BMS 10 may include a first BMS positive electrode terminal 11 and a second BMS positive electrode terminal 12 connected to a positive electrode of the power supply unit 1, and a first BMS negative electrode terminal 13 and a second BMS negative electrode terminal 14 connected to a negative electrode or a ground of the power supply unit 1. Further, the contactor 2 may include a first contactor positive electrode terminal 21 a second contactor positive electrode terminal 22, a first contactor negative electrode terminal 23, and a second contactor negative electrode terminal 24. However, throughout the present specification, it is noted that each of the first BMS positive electrode terminal 11, the second BMS positive electrode terminal 12, the first BMS negative electrode terminal 13, the second BMS negative electrode terminal 14, the first contactor positive electrode terminal 21, the second contactor positive electrode terminal 22, the first contactor negative electrode terminal 23, and the second contactor negative electrode terminal 24 is one node and is provided for describing a connection relationship between the constituent elements, and is not required to be essentially separately provided as a physically divided constituent element.

Further, the BMS 10 and the contactor 20 each of which includes the two positive electrode terminals and two negative electrode terminals are described, but are illustrative for the exemplary embodiment, and the present invention also includes the case where each of the BMS 10 and the contactor 20 includes the larger number of terminals.

Further, the BMS 10 may further include a main control unit (MCU) 10' that is a central processing unit which controls the BMS 10 as a constituent element.

In this case, the MCU 10' may serve to control a current flowing from the power supply unit 1 to the first BMS positive electrode terminal 11, the second BMS positive electrode terminal 12, the first BMS negative electrode terminal 13, and the second BMS negative electrode terminal 14.

For example, the MCU 10' controls on/off of switches (not illustrated) formed between the first BMS positive electrode terminal 11, the second BMS positive electrode terminal 12, the first BMS negative electrode terminal 13, and the second BMS negative electrode terminal 14 and the power supply unit 1, thereby controlling the current flowing from the power supply unit 1 to the first BMS positive electrode terminal 11, the second BMS positive electrode terminal 12, the first BMS negative electrode terminal 13, and the second BMS negative electrode terminal 14.

However, it is noted that the role of the MCU 10' and the method of controlling the current by the MCU 10' are not limited to the foregoing.

Further, referring to FIGS. 1 and 3, the BMS 10 may further include a plurality of fuses 15 or a plurality of switches 16 connected with the first BMS positive electrode terminal 11, the second BMS positive electrode terminal 12, the first BMS negative electrode terminal 13, and the second BMS negative electrode terminal 14, respectively.

In this case, the plurality of fuses 15 or the plurality of switches 16 may serve to block an overcurrent from flowing into the BMS 10 due to an external short-circuit.

Further, when an overcurrent flows from the power supply unit 1 into the BMS 10, the plurality of fuses 15 or the plurality of switches 16 is blown or off, thereby serving to block the overcurrent from flowing from the power supply unit 1 into the contactor 20.

More particularly, the plurality of fuses 15 or the plurality of switches 16 is autonomously blown or off in a predetermined amount of current, so that it is possible to block the overcurrent from flowing into the BMS 10, but it is noted that the present invention is not limited thereto.

For example, the BMS 10 may include a detecting unit (not illustrated) which detects a voltage supplied from the power supply unit 1 to the plurality of fuses 15 or the plurality of switches 16, and a controller (not illustrated) which blows or turns off the plurality of fuses 15 or the plurality of switches 16 when the overcurrent is detected in the plurality of fuses 15 or the plurality of switches 16, and in this case, the BMS 10 controls the blow or the off of the plurality of fuses 15 or the plurality of switches 16 via the detecting unit (not illustrated) and the controller (not illustrated), thereby blocking the overcurrent from flowing into the BMS 10.

In this case, the detecting unit (not illustrated) and the controller (not illustrated) may be included in the MCU 10' of the BMS 10 illustrated in FIGS. 1 to 4, but it is noted that the present invention is not limited thereto.

In the meantime, referring to FIG. 2, when the fuse 15 connected to the first BMS positive electrode terminal 11 among the plurality of fuses 15 is blown due to the overcurrent, the BMS 10 may maintain the connection with the contactor 20 via the second BMS positive electrode terminal 12 connected with the second contactor positive electrode terminal 22 of the contactor 20 and the second BMS negative electrode terminal 14 connected with the second contactor negative electrode terminal 24.

Further, referring to FIG. 4, when the switch 16 connected to the first BMS positive electrode terminal 11 among the plurality of switches 16 is off due to the overcurrent, the BMS 10 may maintain the connection with the contactor 20 via the second BMS positive electrode terminal 12 connected with the second contactor positive electrode terminal 22 of the contactor 20 and the second BMS negative electrode terminal 14 connected with the second contactor negative electrode terminal 24.

That is, in the circuit 100 for preventing power off of the contactor according to the exemplary embodiment of the present invention, the BMS 10 is multi-connected with the contactor 20 via the first BMS positive electrode terminal 11, the second BMS positive electrode terminal 12, the first BMS negative electrode terminal 13, and the second BMS negative electrode terminal 14 provided in the BMS 10, and the first contactor positive electrode terminal 21, the second contactor positive electrode terminal 22, the first contactor negative electrode terminal 23, and the second contactor negative electrode terminal 21 provided in the contactor 20, so that even when any one connection among the multiple connections has abnormality, it is possible to maintain a connection state of the BMS 10 and the contactor 20 through another connection.

Next, the contactor 20 may serve to make a connection between a battery pack 2 and a load 3 be on/off as illustrated in FIG. 1.

To this end, the contactor 20 may include the first contactor positive electrode terminal 21 connected to the first BMS positive electrode terminal 11, the second contactor positive electrode terminal 22 connected to the second BMS positive electrode terminal 12, the first contactor negative electrode terminal 23 connected to the first BMS negative electrode terminal 13, and the second contactor negative electrode terminal 24 connected to the second BMS negative electrode terminal 14.

Further, the contactor 20 may further include a coil 25 which receives power from the power supply unit 1 via the BMS 10 and generates a magnetic field to control on/off of the contactor 20 as a constituent element, but the coil 25 is the constituent element generally included in the contactor 20, so that a detailed description thereof will be omitted.

Further, the contactor 20 may further include a plurality of diodes connected to the first contactor positive electrode terminal 21, the second contactor positive electrode terminal 22, the first contactor negative electrode terminal 23, and the second contactor negative electrode terminal 24, respectively.

Herein the plurality of diodes 26 is formed Between the coil 25 and the first contactor positive electrode terminal 21, the second contactor positive electrode terminal 22, the first contactor negative electrode terminal 23, and the second contactor negative electrode terminal 24 to serve to determine a direction of the current.

Further, the contactor 20 may further include a first connector 27 including the first contactor positive electrode terminal 21 and the first contactor negative electrode terminal 22 and the second connector 28 including the second contactor positive electrode terminal 23 and the second contactor negative electrode terminal 24.

That is, the first contactor positive electrode terminal 21 and the first contactor negative electrode terminal 23, and the second contactor positive electrode terminal 22 and the second contactor negative electrode terminal 24 of the contactor 20 are connected to the first BMS positive electrode terminal 11 and the first BMS negative electrode terminal 13, and the second BMS positive electrode terminal 12 and the second BMS negative electrode terminal 14 provided in the BMS 10 via the different first connector 27 and second connector 28, so that even when any one of the first connector 27 and the second connector 28 has abnormality (for example, damage), the connection between the contactor 20 and the BMS 10 may be maintained via another connector (one having no abnormality between the first connector 27 and the second connector 28).

In the foregoing, the specific embodiment of the present invention has been described, but the technical spirit of the present invention is not limited to the accompanying drawings and the described contents. Those skilled in the art will appreciate that various forms of modifications are possible within the range without departing from the spirit of the present invention, and it shall be construed in a manner that the modification belongs to the claims of the present invention without violating the spirit of the present invention.

The invention claimed is:

1. An off-prevention circuit, the circuit comprising:
a contactor including a coil; and
a battery management system (BMS) which controls power supplied to the contactor by controlling power to the coil from a power supply, and includes a first BMS positive electrode terminal and a second BMS positive electrode terminal for connection to a positive electrode of the supply and a first BMS negative electrode terminal and a second BMS negative electrode terminal for connection to a ground or a negative electrode of the power supply, wherein the contactor is configured to make an on/off connection between a battery pack and a load, the contactor including a first contactor positive terminal connected to the first BMS positive electrode terminal and a second contactor positive electrode terminal connected to the second BMS positive electrode terminal, and a first contactor negative electrode terminal connected to the first BMS negative electrode terminal and a second contactor negative electrode terminal connected to the second BMS negative electrode terminal, wherein the BMS includes a plurality of fuses or a plurality of switches, wherein a first of the plurality of fuses or the plurality of switches has a first end connected to the first BMS positive electrode terminal and a second end connected to the power supply, wherein a second of the plurality of fuses or the plurality of switches includes a first end connected to the second BMS positive electrode terminal and a second end connected to the power supply, wherein a third of the plurality of fuses or the plurality of switches includes a first end connected to the first BMS negative electrode terminal and a second end connected to the ground, wherein a fourth of the plurality of fuses or the plurality of switches includes a first end connected to the second BMS negative electrode terminal and a second end connected to the ground, and wherein the coil is connected to each of the first contactor positive electrode terminal, the second contactor positive electrode terminal, the first contactor negative electrode terminal, and the second contactor negative electrode terminal, the coil configured to receive power from the power supply to generate a magnetic field to turn on/off the contactor.

2. The circuit of claim 1,
wherein a plurality of diodes, the plurality of diodes including a diode formed between the coil and each of the first contactor positive electrode terminal, the second contactor positive electrode terminal, the first contactor negative electrode terminal, and the second contactor negative electrode terminal, and which determine a direction of a current.

3. The circuit of claim 1, wherein the contactor further includes:
a first connector including the first contactor positive electrode terminal and the first contactor negative electrode terminal; and
a second connector including the second contactor positive electrode terminal and the second contactor negative electrode terminal.

* * * * *